(12) United States Patent
Nagafuji et al.

(10) Patent No.: US 8,534,897 B2
(45) Date of Patent: Sep. 17, 2013

(54) OPTICAL WAVEGUIDE DEVICE

(75) Inventors: Akiko Nagafuji, Ibaraki (JP); Noriyuki Juni, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 237 days.

(21) Appl. No.: 13/162,214

(22) Filed: Jun. 16, 2011

(65) Prior Publication Data
US 2011/0310634 A1    Dec. 22, 2011

(30) Foreign Application Priority Data

Jun. 18, 2010  (JP) .................................. 2010-139063

(51) Int. Cl.
*F21V 7/04* (2006.01)
*G02B 6/10* (2006.01)
*G02B 6/26* (2006.01)

(52) U.S. Cl.
USPC ............. 362/610; 362/616; 385/39; 385/129; 345/176

(58) Field of Classification Search
USPC .................. 362/610, 551, 616, 554–556, 628; 385/39, 43–45, 129, 901; 345/176
See application file for complete search history.

(56) References Cited

U.S. PATENT DOCUMENTS

| 5,914,709 | A * | 6/1999 | Graham et al. ............... 345/179 |
| 6,056,426 | A * | 5/2000 | Jenkins .......................... 362/558 |
| 7,088,889 | B2 | 8/2006 | Takahashi et al. |
| 7,471,865 | B2 | 12/2008 | Graham |
| 7,520,050 | B2 | 4/2009 | Graham |
| 7,676,131 | B2 * | 3/2010 | Luo ............................... 385/129 |
| 7,809,221 | B2 * | 10/2010 | Deane ............................ 385/33 |
| 8,023,778 | B2 * | 9/2011 | Juni ............................... 385/14 |
| 8,120,595 | B2 * | 2/2012 | Kukulj et al. ................. 345/176 |
| 8,200,051 | B2 * | 6/2012 | Khan et al. ..................... 385/14 |
| 8,358,887 | B2 * | 1/2013 | Nagafuji et al. ................ 385/32 |
| 2005/0041925 | A1 | 2/2005 | Takahashi et al. |
| 2005/0271319 | A1 | 12/2005 | Graham |

(Continued)

FOREIGN PATENT DOCUMENTS

| JP | 2001-514779 A | 9/2001 |
| JP | 2003-294962 A | 10/2003 |

(Continued)

OTHER PUBLICATIONS

Japanese Office Action dated Jul. 2, 2013, issued in corresponding Japanese Patent Application No. 2010-139063, with English translation (4 pages).

*Primary Examiner* — Bao Q Truong
(74) *Attorney, Agent, or Firm* — Westerman, Hattori, Daniels & Adrian, LLP (57) ABSTRACT

An optical waveguide device is provided which is capable of distributing light beams from a light source equally to long and short sides of a rectangular panel and which does not require a high degree of accuracy for alignment between the light source and a core. The optical waveguide device includes the light source provided on an edgewise extending frame part of a rectangular panel, and an optical waveguide provided on the frame part and including the branched core having a common portion closer to the light source, the branched core being divided from the common portion into a first core portion and a second core portion orthogonal to each other. The common portion is disposed at a corner of the frame part. The second core portion has a width greater than the width of the first core portion.

8 Claims, 3 Drawing Sheets

(56) References Cited

U.S. PATENT DOCUMENTS

| | | |
|---|---|---|
| 2007/0154133 A1 | 7/2007 | Graham |
| 2009/0237375 A1 | 9/2009 | Khan et al. |
| 2010/0007633 A1 | 1/2010 | Juni |
| 2010/0027937 A1 | 2/2010 | Juni |

FOREIGN PATENT DOCUMENTS

| | | |
|---|---|---|
| JP | 2008-504563 A | 2/2008 |
| JP | 2009-230761 A | 10/2009 |
| JP | 2010-20103 A | 1/2010 |
| JP | 2010-32378 A | 2/2010 |
| WO | 98/40844 A1 | 9/1998 |

\* cited by examiner

RELATED ART

OPTICAL WAVEGUIDE DEVICE

BACKGROUND OF THE INVENTION

1. Field of the Invention

The present invention relates to an optical waveguide device which is disposed on an edge of a detection region defined by a rectangular panel, such as an optical touch panel and an optical shape sensor, and which forms a lattice of light beams in the detection region.

2. Description of the Related Art

In the past, an optical detection means for optically detecting the location of a finger and the like using an optical waveguide has been used as one of the means for detecting the location of a touch on a touch panel, as disclosed in Japanese Unexamined Patent Application Publication Nos. 2010-20103 and 2010-32378.

This optical detection means is configured such that a light-emitting section of a light-emitting optical waveguide device provided on left-hand and right-hand side portions on opposite side of a corner of a rectangular panel (or a screen or the like) emits a large number of substantially parallel light beams toward other side portions opposed to the above-mentioned left-hand and right-hand side portions, with the detection region of the panel therebetween, to form a lattice of light beams within the detection region, and such that a light-receiving element or the like detects light beams incident on a light-receiving section of a light-receiving optical waveguide provided on the other sides of the panel. In this state, when an object such as a finger blocks some of the light beams within the detection region, the light-receiving element or the like connected to the light-receiving optical waveguide senses where some light beams are blocked, so that the location (i.e., X and Y coordinates) of the finger touch or the like is specified.

Figure 3:
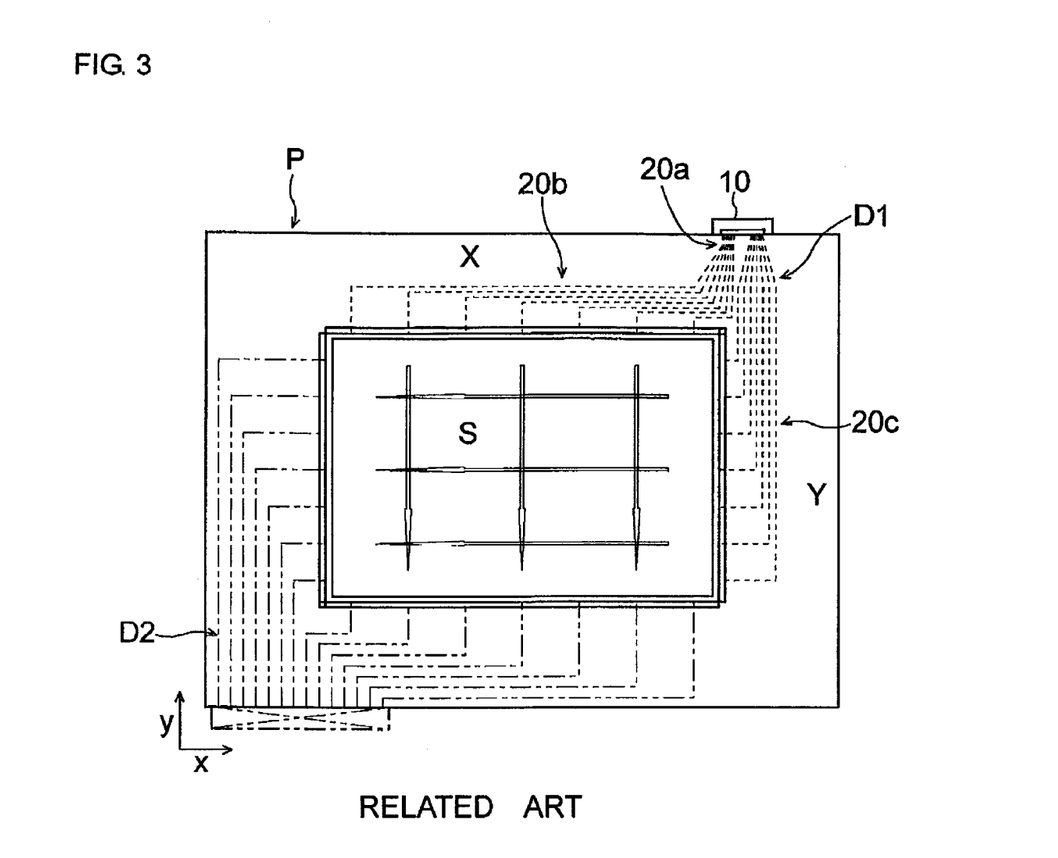
FIG. 3 is a schematic view showing a core pattern of a conventional optical waveguide device.

FIG. 3 is a schematic view showing a core pattern of a conventional light-emitting optical waveguide device used for the above-mentioned touch panel and the like. The reference character P designates a rectangular panel having a pair of long sides X (extending in the x-direction), and a pair of short sides Y (extending in they-direction). The reference character D1 designates the light-emitting optical waveguide device including an optical waveguide having cores indicated by dotted lines, and D2 designates a light-receiving optical waveguide device including an optical waveguide having cores indicated by dash-double-dot lines.

As shown in FIG. 3, the cores of the conventional light-emitting optical waveguide device D1 diverge just ahead of their proximal ends 20a which receive light beams from a light source 10 into a plurality of light-emitting cores 20b extending along a long side X of the panel P, and a plurality of light-emitting cores 20c extending along a short side Y thereof. The light beams coming from the light source 10 into the cores are distributed to the large number of light-emitting cores 20b and 20c, and are emitted outwardly from distal ends of the respective light-emitting cores 20b and 20c, as disclosed in Japanese Unexamined Patent Application Publication (Translation of PCT Application) No. 2001-514779.

SUMMARY OF THE INVENTION

Studies conducted by the present inventors, however, have shown that it is often difficult for the conventional optical waveguide device having a core branching structure as mentioned above to distribute light beams equally to two adjacent sides. The present inventors have found out the cause of such difficulties to be described below. Some of the light beams coming from the light source 10 into the cores of the light-emitting optical waveguide device D1 travel in a straight line along one of the two sides (in the related art as shown in FIG. 3, in the light-emitting cores 20c along the short side Y), whereas other light beams along the other side (in the related art as shown in FIG. 3, in the light-emitting cores 20b along the long side X) travel in a path bent at the proximal ends 20a (an optical coupling part with the light source) of the cores. This results in increased optical losses at the bends in the cores, which makes it difficult to distribute equal amounts of light to the long and short sides X and Y of the panel P.

Further, the present inventors have found another drawback to be described below. In this conventional light-emitting optical waveguide device D1, the light-emitting cores 20b extending along the long side X and the light-emitting cores 20c extending along the short side Y are provided in individually corresponding relationship to the light source 10 to find difficulties in alignment. Misalignment between the optical axes of the proximal ends 20a of the cores 20b and 20c and the optical axis of the light source 10 will increase a difference in the amounts of light between the cores 20b and 20c to accordingly further increase a difference in the amounts of light distributed between the long side X and the short side Y of the panel P.

In view of the foregoing, an optical waveguide device which is capable of distributing light beams from a light source equally to long and short sides of a rectangular panel and which does not require a high degree of accuracy for alignment between the light source and a core is provided.

The optical waveguide device comprises: a light source provided on an edgewise extending frame part of a rectangular panel; and an optical waveguide provided on the frame part and including a branched core having a common portion closer to the light source, the branched core being divided from the common portion into two directions orthogonal to each other, the common portion being disposed at a corner of the frame part, the branched core further including a first core portion extending in a straight line along a long side of the panel from the common portion, and a second core portion having a proximal part curved in the form of an arch over a predetermined length from a branch point of the common portion and a distal part extending in a straight line along a short side of the panel, the second core portion having a width greater than that of the first core portion.

Specifically, the present inventors have made studies of an optical waveguide device suitable for the frame-like configuration of the panel. As a consequence of the studies, the present inventors have found that the amount of light is equally distributed to portions of the core on the long side and on the short side when a relatively wide core end portion (the common portion on the light-receiving side) is adapted to receive light beams from the light source and is divided into the two portion on the long and short sides of the panel, the core portion on the short side having a curved part being wider than the core portion on the long side.

The present inventors also have found that, when the common portion is provided by joining the proximal parts of the core on the long and short sides together and is brought into correspondence with the light source, an imbalance in the amount of light between the portions of the core on the long side and on the short side does not occur, with little influence exerted on the accuracy of alignment.

In the optical waveguide device, the common portion of the branched core is disposed at a corner of the frame part of the panel. The branched core further includes the first core portion extending in a straight line along the long side of the panel from the common portion, and the second core portion having the proximal part curved in the form of an arch over a predetermined length from the branch point of the common portion and the distal part extending in a straight line along the short side of the panel. The width (W2) of the second core portion is greater than the width (W1) of the first core portion (W1<W2).

In this manner, the optical waveguide device is designed such that the core width on the short side is greater than that on the long side in anticipation of optical losses in the curved part on the short side. This reduces the difference in the amount of light between the long side and the short side to accomplish the equal distribution of the amount of light to the long and short sides.

Additionally, the optical waveguide device is not required to perform high-accuracy alignment between the core and the optical source, which has been needed in the conventional optical waveguide device, because the common portion is provided by joining the proximal parts of the core on the long and short sides together and is brought into correspondence with the light source. If precise alignment is not performed between the core and the light source, only the total amount of light propagating in the core decreases, but the imbalance in the amount of light between the portions of the core on the long side and on the short side does not result.

Preferably, the ratio (W2/W1) of the width (W2) of the second core portion to the width (W1) of the first core portion is in the range of 1.5 to 5. Such an optical waveguide device is capable of distributing light beams directed toward the long and short sides of the panel, with a smaller difference in the amount of light therebetween.

Preferably, each of the first and second core portions after branching includes light-emitting passages that are subdivisions of each of the first and second core portions, and light beams passing through the light-emitting passages are emitted toward sides opposed respectively to the first and second core portions. In such an optical waveguide device, the light beams distributed approximately equally to the first and second core portions are subdivided as described above, and the subdivided light beams are emitted from the light-emitting passages. Thus, the light beams having a uniform light intensity in the longitudinal directions of both the long and short sides of the panel are emitted from the light-emitting passages on both sides toward the opposed sides. When used on the light-emitting side of the above-mentioned optical detection means and the like, this optical waveguide device is capable of detecting the entire detection region with high accuracy without any blind spots.

Preferably, the light source is disposed at a corner of the frame part on the short side, and light beams directed from the light source toward the long side of the frame part enter an end portion of the common portion. In such an optical waveguide device, the light beams emitted from the light source enter the common portion disposed at a corner of the frame part, and then reach the distal end of the core (the first core portion) on the long side of the panel without being bent (in a straight line). Thus, the optical waveguide device is capable of utilizing the light beams from the light source most efficiently.

DETAILED DESCRIPTION OF THE INVENTION

A preferred embodiment will now be described in detail with reference to the drawings.

Figure 1A:
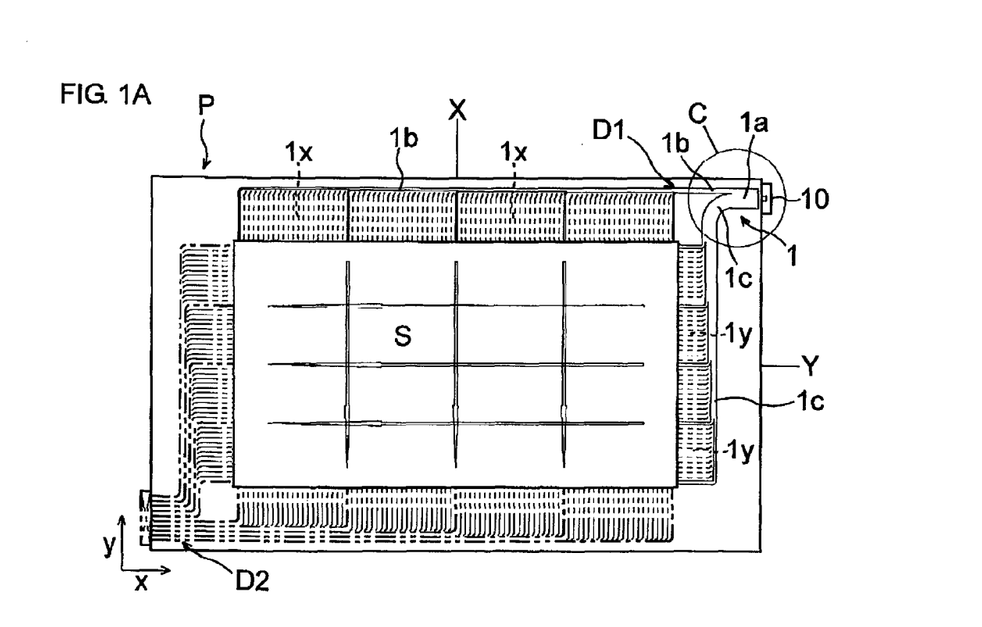
FIG. 1A is a schematic view showing a core pattern of an optical waveguide device according to a preferred embodiment.

First, a touch panel sensor including a light-emitting optical waveguide device D1 according to the present preferred embodiment will be described in outline. The touch panel sensor (device) shown in FIG. 1A is disposed, for example, around (in a frame part of) a display screen of a flat panel display, and includes a panel P having a central detection region S of a rectangular shape (with a long side X and a short side Y at the ratio of 16 to 9, for example) depending on the size of the display screen.

The light-emitting optical waveguide device D1 constituting this touch panel sensor, and a light-receiving optical waveguide device D2 are disposed in the frame part around the detection region S. As in the conventional optical touch panel sensor, the light-emitting optical waveguide device D1 projects a large number of light beams (indicated by hollow arrows in FIG. 1B) to form a lattice of light beams within the detection region S, and a light-receiving element (a CCD array or the like) detects some of the light beams traveling across the detection region S and reaching the light-receiving optical waveguide device D2. The optical waveguide devices D1 and D2 cannot be viewed when in use because a cover or the like is put over the frame part. The light-receiving optical waveguide device D2 is similar in configuration to the conventional one, and will not be described in detail.

Figure 1B:
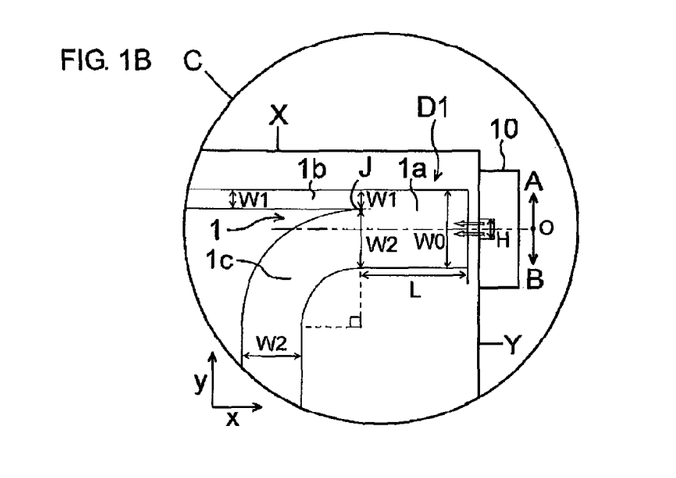
FIG. 1B is an enlarged view of a portion enclosed with a circle C of FIG. 1A.

Next, description will be given on the light-emitting optical waveguide device (hereinafter referred to simply as an "optical waveguide device") according to the present preferred embodiment, which is used on the light-emitting side of the touch panel sensor as mentioned above. As shown in FIG. 1A, the optical waveguide device D1 according to the present preferred embodiment includes a light source 10, and an optical waveguide having a branched core 1 divided into two directions orthogonal to each other. As shown in FIG. 1B, the branched core 1 in the optical waveguide includes a relatively wide common portion 1a provided on a first end (a right-hand end as seen in the figure), a first core portion 1b extending in a straight line along the long side X of the panel P from the common portion 1a, and a second core portion 1c branching off at a branch point J of the common portion 1a and extending along the short side Y of the panel P. At the branch point J of the common portion 1a, the core width (W2) of the second core portion 1c is greater than the core width (W1) of the first core portion 1b (W1<W2), and the second core portion 1c having such a greater width extends in a straight line along the short side Y.

The optical waveguide device D1 will be described in further detail. When the optical waveguide for use in the optical waveguide device D1 is, for example, a polymer-based optical waveguide, the core 1 patterned into the above-mentioned configuration by a photolithographic method and the like is disposed between an under cladding layer and an over cladding layer (both not shown) which are made of a resin material.

The common portion 1a of the core 1 has a relatively large core width W0 which is the sum of the width W1 of the first core portion 1b and the width W2 of the second core portion 1c, and has an end surface at its first end (a right-hand end as seen in the figure) serving as an optical coupling surface that receives light beams (indicated by the hollow arrows) from the light source 10. Preferably, the core width W0 of the common portion 1a is in general greater than the width H of a light-emitting section of the light source 10 for the purpose of facilitating the optical coupling with the light source 10. For example, when the width H of the light-emitting section of the light source 10 is approximately 10 μm, the common portion 1a is designed to have the core width W0 in the range of 300 to 500 μm. Also, the common portion 1a preferably has a length L (from the first end surface or the optical coupling surface to the branch point J) in the range of 1500 to 3000 μm along the optical axis thereof (indicated by a dash-and-dot line).

The first core portion 1b divided from the common portion 1a of the core 1 extends in a straight line in the form of a partial extension of the common portion 1a so as to guide the light beams from the light source 10 in a straight line also after the branching. As mentioned above, the core width W1 of the first core portion 1b is less than the core width W2 of the second core portion 1c to be described later, and is preferably in the range of 100 to 250 μm, and more preferably in the range of 100 to 200 μm.

The second core portion 1c divided from the common portion 1a is separated from the first core portion 1b at the branch point J, and is curved in the form of an arch over a predetermined length from the branch point J. Part of the second core portion 1c forward of the curved part extends in a straight line along the short side Y of the panel P (with reference to FIG. 1A). The curved part of the second core portion 1c is configured such that the optical axis of the common portion 1a extending along the long side X of the panel P is bent through 90 degrees toward the short side Y, and has a radius of curvature preferably in the range of 1 to 5 mm, and more preferably in the range of 2 to 3 mm to prevent the increase in optical losses. The core width W2 at and ahead of the branch point J is greater than the core width W1 of the first core portion 1b as mentioned above, and is preferably in the range of 150 to 500 μm, and more preferably in the range of 200 to 340 μm.

The ratio (W2/W1) of the core width W2 of the second core portion 1c to the core width W1 of the first core portion 1b at the branch point J is preferably in the range of 1.5 to 5, and more preferably in the range of 2 to 4 (with reference to FIG. 1B). The preferred thickness (height) of the core 1, which depends on the size of the light-emitting section of the light source 10 to be described later, is in the range of 20 to 100 μm, for example.

Since the optical waveguide device D1 according to the present preferred embodiment is adapted for use in a touch panel sensor, the first core portion 1b and the second core portion 1c on their second ends (which are opposite from the common portion 1a) have a large number of light-emitting passages 1x and 1y branching off from the core portions 1b and 1c in order, as shown in FIG. 1A. The light-emitting passages 1x and 1y are configured to emit the light beams (e.g., near-infrared radiation and the like) after the above-mentioned branching toward the sides opposed to the first core portion 1b and the second core portion 1c, with the detection region S therebetween.

For the purpose of avoiding complexity in illustration, only part of the light-emitting passages 1x and 1y (and part of the emitted light beams indicated by the hollow arrows) are shown in FIG. 1A by solid lines, and the remainder of the light-emitting passages 1x and 1y are abbreviated using dotted lines. The number of light-emitting passages 1x and 1y is designed as appropriate, depending on the size of the touch panel, the resolution of the sensor, and the like. For example, the number of light-emitting passages 1x on the long side X branching off from the first core portion 1b used herein is on the order of 220 to 800, and the number of light-emitting passages 1y on the short side Y branching off from the second core portion 1c used herein is on the order of 150 to 600.

Examples of the light source 10 used herein for the optical waveguide device D1 include a light-emitting diode (LED) and a semiconductor laser. In particular, a VCSEL (vertical cavity surface emitting laser) excellent in light transmission characteristics is preferably used as the light source 10. Preferably, the wavelength of the light beams emitted from the light source 10 is in a near-infrared wavelength region (in the range of 700 to 2500 nm).

As illustrated in FIG. 1A, the light source 10 is disposed at a corner of the frame part on the short side Y of the panel P, and is positioned so that the light-emitting section (having the width H) thereof faces toward the long side X of the panel P. This positioning allows the light beams emitted from the light source 10 to enter the end surface (the optical coupling surface) of the common portion 1a of the core 1 of the optical waveguide as shown in FIG. 1B and to reach the opposite end along the long side X of the panel P without being bent. Thus, the optical waveguide device D1 is capable of efficiently utilizing the light beams from the light source 10.

In the optical waveguide device D1 having the above-mentioned configuration, as mentioned above, the core 1 of the optical waveguide has a pattern divided into the first core portion 1b extending in a straight line along the long side X of the panel P, and the second core portion 1c branching off and curved at the branch point J and extending along the short side Y of the panel P. In consideration of the curved part of the second core portion 1c, the second core portion 1c has the core width W2 greater than the core width W1 of the first core portion 1b (W1<W2), and the ratio of the core width W2 to the core width W1 (W2/W1) is in the range of 1.5 to 5. This enables the optical waveguide device D1 to distribute the light beams incident on the common portion 1a to the long side X and the short side Y of the panel P in a balanced manner, with a slight difference in the amount of light therebetween.

Also, the first core portion 1b along the long side X and the second core portion 1c along the short side Y branch off from the common portion 1a corresponding to the light source 10. As a result, if there is a small misalignment between the common portion 1a and the light source 10, the difference in the amount of light between the long side X and the short side Y which results from the misalignment is reduced, so that the balance of the amount of light is maintained between the light beams distributed to the long side X and the light beams distributed to the short side Y. The optical waveguide device D1 there fore has s a wide allowable range of alignment between the light source 10 and the core 1, as compared with that for an optical waveguide device having the conventional configuration.

If the ratio (W2/W1) of the core width W2 of the second core portion 1c to the core width W1 of the first core portion 1b is less than 1.5, the amount of light in the first core portion 1b along the long side X which branches off in a straight line from the common portion 1a tends to be too large. If the core width ratio (W2/W1) is greater than 5, on the other hand, the amount of light in the second core portion 1b along the short side Y which branches off in a curved line from the common portion 1a tends to be too large. In such cases, the balance of the amount of light tends to be lowered.

The polymer-based optical waveguide including the branched core 1 made of a resin material (a polymeric material) is taken as an example in the present preferred embodiment. The material of the core 1, however, is required only to have a refractive index higher than that of the cladding layers provided around the core 1, such as glass and the like. It is, however, preferable that the difference in refractive index between the core 1 and the cladding layers provided therearound is not less than 0.01. In consideration for characteristics of patterning into the above-mentioned shape, photosensitive resins such as ultraviolet curable resins are most preferably used as the material of the core 1. Examples of the ultraviolet curable resins used herein include acrylic based ultraviolet curable resins, epoxy based ultraviolet curable resins, siloxane based ultraviolet curable resins, norbornene based ultraviolet curable resins, and polyimide based ultraviolet curable resins.

The material of the cladding layers around the core 1 is required only to be a material selected from among the above-mentioned photosensitive resins such as ultraviolet curable resins and having a refractive index lower than that of the core 1. Other materials usable also for a flat substrate, such as glass, silicon, metal and resin, may be used as the material of the cladding layers. Only the under cladding layer under the core 1 may be provided, and the over cladding layer for covering the core 1 need not be formed.

The above-mentioned optical waveguide is produced by a dry etching method using plasma, a transfer method, a photolithographic method using exposure and development, a photo-bleaching method, and the like.

Next, description will be given on a method of producing an optical waveguide for use in the optical waveguide device D1. The process of producing the branched core 1 by a photolithographic method using an ultraviolet curable resin will be described as an example.

FIGS. 2A to 2D are sectional views schematically illustrating a method of manufacturing an optical waveguide for an optical waveguide device according to the preferred embodiment. In FIGS. 2A to 2D, the reference numeral 1 designates the core (branched core); 2 designates the under cladding layer; 3 designates the over cladding layer; 11 designates a substrate; and 12 designates a molding die. FIGS. 2A to 2D show a sequence of steps for the production of the optical waveguide, and the description will be given below in this sequence.

First, the substrate 11 of a flat shape is prepared. Examples of the material of the substrate 11 include glass, quartz, silicon, resin, metal and the like. The thickness of the substrate 11 is, for example, in the range of 20 μm (for a film-like substrate 11) to 5 mm (for a plate-like substrate 11).

Figure 2A:
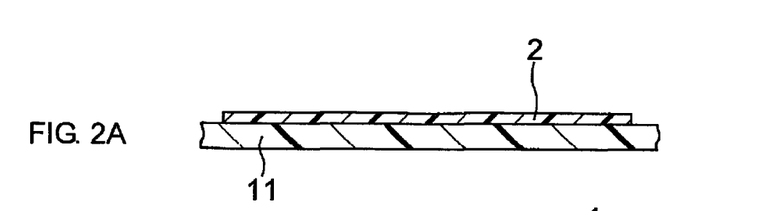
FIGS. 2A to 2D are sectional views schematically illustrating a method of manufacturing an optical waveguide for use in the optical waveguide device according to the preferred embodiment.

Then, as shown in FIG. 2A, the under cladding layer 2 is formed on a predetermined region of the substrate 11. Examples of the material for the formation of the under cladding layer 2 include thermosetting resins and photosensitive resins. When a thermosetting resin is used, a varnish prepared by dissolving the thermosetting resin in a solvent is applied to the substrate 11 and is then heated to thereby form the under cladding layer 2. When a photosensitive resin is used, on the other hand, a varnish prepared by dissolving the photosensitive resin in a solvent is applied to the substrate 11 and is then exposed to irradiation light such as ultraviolet light to thereby form the under cladding layer 2. There are cases where a heating treatment is performed after the exposure to complete the photoreaction.

Figure 2B:
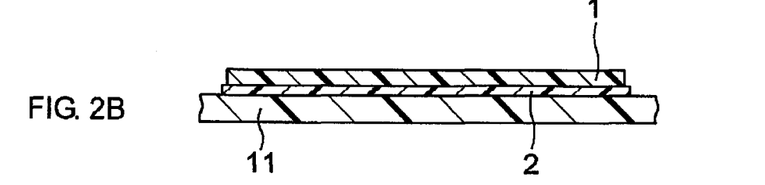

Next, as shown in FIG. 2B, the core 1 having a predetermined (branched) pattern is formed on a surface (upper surface) of the under cladding layer 2. For the formation of the core 1 by the above-mentioned photolithographic method, preferred examples of the material for the formation of the core 1 include photosensitive resins (photopolymerizable resins) such as epoxy resins, polyimide resins, acrylic resins, methacrylic resins, oxetanes, and silicone resins. Of these resins, epoxy resins are most preferable from the viewpoints of costs, film thickness controllability, losses and the like.

The material for the formation of the core 1 used herein has a refractive index higher than that of the material for the formation of the under cladding layer 2 described above and the over cladding layer 3 to be described below. The adjustment of the refractive indices may be made, for example, by adjusting the selection of the types of the materials for the formation of the core 1 and the cladding layers, and the composition ratio thereof.

The formation of the core 1 will be described in detail. The process of forming the core 1 includes: applying a varnish containing the above-mentioned photosensitive resin onto the under cladding layer 2 by a spin coating method, a dipping method, a die coating method, a roll coating method and the like to form a varnish layer (a photosensitive resin layer); and then irradiating the varnish layer with ultraviolet light and the like through a photomask having an opening pattern corresponding to the core pattern to expose the varnish layer in a predetermined pattern to the ultraviolet light and the like.

The opening pattern of the photomask used in this process is shaped to correspond, at one end, to the relatively wide common portion 1a, and to correspond, at the other end, to the branched core including the first core portion 1b extending in a straight line along the long side X of the panel P, and the second core portion 1c branched off from the common portion 1a and extending along the short side Y of the panel P (with reference to FIG. 1A). The opening pattern of the photomask is also shaped so that the core width (W2) of the second core portion 1c is greater than the core width (W1) of the first core portion 1b at the branch point J of the common portion 1a (with reference to FIG. 1B).

Part of the photomask corresponding to the first core portion 1b after the branching has a pattern of a large number of (on the order of 220 to 800) fine branches corresponding to the light-emitting passages 1x on the long side X as mentioned above. Similarly, part of the photomask corresponding to the second core portion 1c after the branching has a pattern of a large number of (on the order of 150 to 600) fine branches corresponding to the light-emitting passages 1y on the short side Y. Each of the light-emitting passages 1x and 1y may include a distal end portion having the shape of a lens that bulges outwardly (as seen in plan view).

After the completion of the above-mentioned exposure, a heating treatment is performed in accordance with the type of photosensitive resin to complete the photoreaction. Thereafter, development using a developing solution is performed by an immersion method, a spray method, a puddle method and the like to dissolve away unexposed portions of the photosensitive resin layer. This produces the core 1 as shown in FIG. 2B.

Figure 2C:
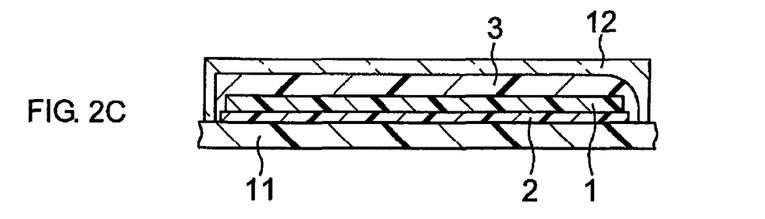

Next, as shown in FIG. 2C, the molding die 12 for the formation of the over cladding layer 3 is prepared to form the over cladding layer 3 covering the core 1 by die-molding. Examples of the material for the formation of the over cladding layer 3, which are similar to those for the under cladding layer 2, include thermosetting resins and photosensitive resins. When a photosensitive resin is used, the molding die 12 used herein is made of a material permeable to ultraviolet light (e.g., made of quartz) because the photosensitive resin that fills the interior of the molding die 12 is required to be exposed to ultraviolet light directed from outside through the molding die 12.

The molding die 12 has a lower surface provided with a recessed portion (mold cavity) having a die surface complementary in shape to the over cladding layer 3. In the present preferred embodiment, part of the molding die 12 (a right-hand end part as seen in FIG. 2C) for covering the distal end portions of the light-emitting passages 1x and 1y is in the form of a quadrantal curved lens surface.

The over cladding layer 3 is formed using the molding die 12 in a manner to be described below. First, using alignment marks and the like as a reference, the lower surface of the molding die 12 is brought into intimate contact with the surface of the substrate 11 so that the core 1 is placed in the mold cavity of the molding die 12. Then, the above-mentioned photosensitive resin is injected through an inlet (not shown) formed in the molding die 12 into a mold space surrounded by the mold cavity, so that the mold space is filled with the photosensitive resin. Next, the photosensitive resin is exposed to ultraviolet light directed through the molding die 12 (made of quartz). Thereafter, a heating treatment is performed, as required. This completes the hardening of the photosensitive resin.

Figure 2D:
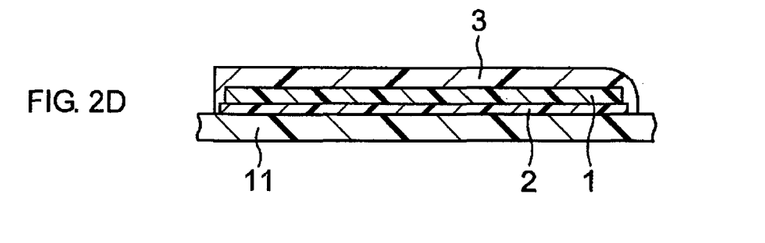

Thereafter, as shown in FIG. 2D, the molded part is removed from the molding die 12. This provides an optical waveguide including the over cladding layer 3 having a lens-shaped end portion.

The optical waveguide device D1 including this optical waveguide is produced in a manner to be described below. First, a punching process using a blade or the like is performed to remove the optical waveguide including the branched core 1 either together with the substrate 11 or from the substrate 11, so that the optical waveguide is cut into an L-shaped configuration along the shape of the frame part of the panel P (or into a rectangular frame-like configuration when the optical waveguide device D1 is produced at the same time as the light-receiving optical waveguide device D2). This optical waveguide is disposed on the frame part of the panel P, as shown in FIG. 1A. Thereafter, the light source 10 such as a VCSEL and the like is disposed at a corner of the frame part on the short side Y of the panel P so as to be opposed to the first end surface (the optical coupling surface) of the common portion 1a of the core 1 of the optical waveguide. The positioning of the light source 10 is done by placing the optical axis of the common portion 1a (indicated by the dash-and-dot line) and the optical axis of the light source 10 into alignment with each other. This completes the optical waveguide device D1 according to the present preferred embodiment.

In the optical waveguide device D1 having the above-mentioned configuration, the first core portion 1b and the second core portion 1c after the branching include the light-emitting passages 1x and the light-emitting passages 1y, respectively, which are subdivisions of the first and second core portions 1b and 1c. The light beams distributed approximately equally into two directions are emitted toward the sides opposed respectively to the first and second core portions 1b and 1c. In particular, when used for an optical detection means for the above-mentioned touch panel and the like, the optical waveguide device D1 is capable of emitting uniform light beams (parallel light beams) having a uniform light intensity in the longitudinal directions of both the long side X and the short side Y of the panel P. The optical detection means including the optical waveguide device D1 according to the present preferred embodiment therefore is capable of detecting the entire detection region with high accuracy without any blind spots.

Next, inventive examples will be described in conjunction with comparative examples. It should be noted that the present invention is not limited to the inventive examples.

EXAMPLES

In the examples, optical waveguides including respective branched cores having varying "ratios (W2/W1) of the core width (W2) of a second core portion to the core width (W1) of a first core portion" were produced. The produced optical waveguides and a light source were used to produce respective optical waveguide devices. Using the produced optical waveguide devices in Inventive Examples 1 to 3 and in Comparative Examples 1 and 2, the amount of light (the intensity of light) emitted from the long side X and the short side Y was measured with a light-receiving element, and differences in the amount of light (balances) between the long side X and the short side Y were compared.

First, materials for the formation of the optical waveguides were prepared.

Material for Formation of Cladding Layers

Component A: 100 parts by weight of an epoxy based ultraviolet curable resin having an alicyclic skeleton (EP4080E available from ADEKA Corporation).

Component B: two parts by weight of a photo-acid generator (CPI-200X available from San-Apro Ltd.).

A material for the formation of an under cladding layer and an over cladding layer was prepared by mixing Components A and B together.

Material for Formation of Core

Component C: 40 parts by weight of an epoxy based ultraviolet curable resin having a fluorene skeleton (OGSOL EG available from Osaka Gas Chemicals Co., Ltd.).

Component D: 30 parts by weight of an epoxy based ultraviolet curable resin having a fluorene skeleton (EX-1040 available from Nagase ChemteX Corporation).

Component E: 30 parts by weight of 1,3,3-tris{4-[2-(3-oxetanyl)]butoxyphenyl}butane.

Component B: one part by weight of a photo-acid generator (CPI-200X available from San-Apro Ltd.).

A material for the formation of the core was prepared by dissolving Components C, D, E, and B in 41 parts by weight of ethyl lactate.

Inventive Example 1

Production of Optical Waveguide
Formation of Under Cladding Layer

First, the material for the formation of the cladding layers was applied to a surface of a polyethylene terephthalate film (having a thickness of 188 μm) serving as a substrate by a spin coating method. Subsequently, the applied material was exposed to ultraviolet light irradiation at a dose of 1000 mJ/cm$^2$. Thereafter, a heating treatment was performed at 80° C. for five minutes. Thus, the under cladding layer (having a thickness of 20 μm) was formed.

Formation of Core

Then, the material for the formation of the core was applied to a surface of the under cladding layer with an applicator. Thereafter, a heating treatment was performed at 100° C. for five minutes to volatilize the solvent. Thus, a photosensitive resin layer for the formation of the core was formed. Next, the photosensitive resin layer was exposed to ultraviolet light irradiation at a dose of 2500 mJ/cm$^2$ through a photomask having an opening pattern identical in shape with the pattern of the branched core. Thereafter, a heating treatment was performed at 100° C. for ten minutes to complete the hardening of the resin. Then, dip development was performed using a developing solution (γ-butyrolactone) to dissolve away unexposed portions of the photosensitive resin layer. Thereafter, a heating treatment was performed at 120° C. for five minutes to dry the remaining portions of the photosensitive resin layer. Thus, the branched core having a patterned thickness (height) of 50 μm was formed.

In Inventive Example 1, a photomask was used having an opening pattern such that an opening width (W1) corresponding to the first core portion at a core branch point was 120 μm, an opening width (W2) corresponding to the second core portion was 240 μm, and an opening width (W0) corresponding to a common portion at which the first and second core portions joined together was 360 μm (with reference to FIG. 1B). As a result, the portions of the core were formed in accordance with such an opening pattern having the above-mentioned widths. Specifically, the core width W1 of the first core portion was 120 μm, and the core width W2 of the second core portion was 240 μm. Also, the ratio (W2/W1) of the core width W2 of the second core portion to the core width W1 of the first core portion was "2" as designed. The opening widths of the opening pattern of the photomask corresponding to the first and second core portions were varied in Inventive Examples 2 and 3 and Comparative Examples 1 and 2 to be described later.

Part of the photomask corresponding to the first core portion after the branching had a pattern of 220 fine openings corresponding to light-emitting passages on the long side X, and part of the photomask corresponding to the second core portion after the branching had a pattern of 165 fine openings corresponding to light-emitting passages on the short side Y. These passages were formed at the same time as the branched core. Parts of the opening pattern of the photomask corresponding to the light-emitting passages were identical with those in Inventive Examples 2 and 3 and Comparative Examples 1 and 2 to be described later.

Formation of Over Cladding Layer

Next, a molding die made of quartz for the formation of the over cladding layer was set so as to cover the core. The material for the formation of the cladding layers was injected through an inlet formed in the molding die into a mold space (cavity). Then, the injected material was exposed to ultraviolet light irradiation at a dose of 2000 mJ/cm$^2$ through the molding die. Thereafter, a heating treatment was performed at 80° C. for five minutes to complete the hardening of the resin. Then, the molded part was removed from the molding die. This provided the over cladding layer (having a thickness of 1 mm from the top surface of the core) including a quadrantal convex lens (with reference to FIG. 2D) at distal end portions of the respective light-emitting passages of the core.

Then, the substrate was stripped away. The entire optical waveguide was cut along the molded over cladding layer into a substantially L-shaped configuration. This provided the optical waveguide for the production of an optical waveguide device in Inventive Example 1.

Production of Optical Waveguide Device Under Test Mounting of Light Source

A VCSEL light source (available from Optowell Co., Ltd.) having an emission intensity (power) of 3 mW was disposed in a predetermined position (with reference to FIG. 1B) opposed to an end of the common portion of the produced optical waveguide. This light source was fixed after alignment so that the center of a light-emitting section (having a width H of 10 μm) of the light source lay on the extension of the optical axis (indicated by the dash-and-dot line) of the core. Thus, an optical waveguide device in Inventive Example 1 was provided. Mounting of Light-Receiving Element Unit for Measurement.

Then, a light-receiving element unit for measuring the intensity of light (a CMOS linear sensor array available from Optowell Co., Ltd.) was prepared. The light-receiving element unit was positioned so that light beams (an optical signal) emitted from the distal end portions of the respective light-emitting passages of the core entered light-receiving sections of respective light-receiving elements of this sensor array (i.e., so that the intensity of light was measured for each of the light-emitting passages, which were in a one-to-one correspondence with the light-receiving elements). In that state, the light-receiving element unit was fixed to the above-mentioned optical waveguide device with an adhesive and the like, and was prepared for measurement of the light intensity.

Inventive Example 2

For the formation of the core in the production of the optical waveguide, a photomask was used which was different in the ratio of the opening width corresponding to the second core portion to the opening width corresponding to the first core portion at the core branch point. Except for this difference, an optical waveguide for the production of an optical waveguide device in Inventive Example 2, which included the first core portion having a core width W1 of 80 μm and the second core portion having a core width W2 of 280 μm (and which accordingly had a core width ratio W2/W1 of 3.5), was produced in a manner similar to that in Inventive Example 1. The light source and the light-receiving element unit for measurement were mounted to this optical waveguide as described above. This provided an optical waveguide device in Inventive Example 2, which was prepared so that the intensity of light was measured for each of the light-emitting passages.

Inventive Example 3

For the formation of the core in the production of the optical waveguide, a photomask was used which was different in the ratio of the opening width corresponding to the second core portion to the opening width corresponding to the first core portion at the core branch point. Except for this difference, an optical waveguide for the production of an optical waveguide device in Inventive Example 3, which included the first core portion having a core width W1 of 140 μm and the second core portion having a core width W2 of 220 μm (and which accordingly had a core width ratio W2/W1 of approximately 1.57), was produced in a manner similar to that in Inventive Example 1. The light source and the light-receiving element unit for measurement were mounted to this optical waveguide as described above. This provided an optical waveguide device in Inventive Example 3, which was prepared so that the intensity of light was measured for each of the light-emitting passages.

For comparative examples, optical waveguides having the ratio (W2/W1) of the core width W2 of the second core portion to the core width W1 of the first core portion which fell outside a preferred range (1.5 to 5) were produced, and used to produce optical waveguide devices.

Comparative Example 1

For the formation of the core in the production of the optical waveguide, a photomask was used which was different in the ratio of the opening width corresponding to the second core portion to the opening width corresponding to the first core portion at the core branch point. Except for this difference, an optical waveguide for the production of an optical waveguide device in Comparative Example 1, which included the first core portion having a core width W1 of 240 µm and the second core portion having a core width W2 of 120 µm (and which accordingly had a core width ratio W2/W1 of 0.5), was produced in a manner similar to that in Inventive Example 1. The light source and the light-receiving element unit for measurement were mounted to this optical waveguide as described above. This provided an optical waveguide device in Comparative Example 1, which was prepared so that the intensity of light was measured for each of the light-emitting passages.

Comparative Example 2

For the formation of the core in the production of the optical waveguide, a photomask was used which was different in the ratio of the opening width corresponding to the second core portion to the opening width corresponding to the first core portion at the core branch point. Except for this difference, an optical waveguide for the production of an optical waveguide device in Comparative Example 2, which included the first core portion having a core width W1 of 180 µm and the second core portion having a core width W2 of 180 µm (and which accordingly had a core width ratio W2/W1 of 1), was produced in a manner similar to that in Inventive Example 1. The light source and the light-receiving element unit for measurement were mounted to this optical waveguide as described above. This provided an optical waveguide device in Comparative Example 2, which was prepared so that the intensity of light was measured for each of the light-emitting passages.

Measurement and Evaluation of Light Intensity

In each of the optical waveguide devices in Inventive Examples 1 to 3 and Comparative Examples 1 and 2 described above, 850-nm infrared beams were emitted from the light source into the core. The intensity of light for each of the light-emitting passages (the intensity of a light beam exiting each of the light-emitting passages and reaching a corresponding one of the light-receiving elements) was measured. Calculated were the average value $I_x$ of 220 intensities of light from the respective light-emitting passages on the long side X, and the average value $I_y$ of 165 intensities of light from the respective light-emitting passages on the short side Y. Then, the absolute value of the difference between the average values $I_x$ and $I_y$ was determined. A difference in the amount of light distributed between the long side and the short side or a "light amount difference between the long and short sides" was evaluated, depending on how high the absolute value was.

The measurements were made both when the optical axis of the core and the optical axis of the light source coincided (or were aligned) with each other and when these axes did not coincide. Specifically, with reference to FIG. 1B, "±0 µm" denoted a situation in which the center of the light source 10 was at a point O lying on the optical axis of the core, so that the optical axes coincided with each other; "+100 µm" denoted a situation in which the center of the light source 10 was intentionally displaced 100 µm in a direction indicated by the arrow A (in the y-direction); and "−100 µm" denoted a situation in which the center of the light source 10 was intentionally displaced 100 µm in a direction indicated by the arrow B.

A laser microscope (available from Keyence Corporation) was used to measure the core width and core height of the optical waveguides, and an optical microscope (MX51 available from Olympus Corporation) was used to measure the amount of displacement between the core center and the light source.

The results of the above-mentioned measurements were listed in Table 1 below.

TABLE 1

|  | Inv. Ex. 1 | Inv. Ex. 2 | Inv. Ex. 3 | Comp. Ex. 1 | Comp. Ex. 2 |
|---|---|---|---|---|---|
| Core Width W1 (µm) of First Core Portion | 120 | 80 | 140 | 240 | 180 |
| Core Width W2 (µm) of Second Core Portion | 240 | 280 | 220 | 120 | 180 |
| Core Width Ratio W2/W1 | 2 | 3.5 | 1.57 | 0.5 | 1 |
| Light Amount Difference "±0 µm" | 0.2 | 0.3 | 0.5 | 2.0 | 0.9 |
| Light Amount Difference "±100 µm" | 0.1 | 0.6 | 0.3 | 2.0 | 1.0 |
| Light Amount Difference "−100 µm" | 0.3 | 0.4 | 0.8 | 2.4 | 1.2 |

As shown in Table 1, each of the optical waveguide devices in Inventive Examples 1 to 3 has a small light amount difference between the long and short sides in the range of 0.2 to 0.5 to distribute the light beams from the light source approximately equally into two directions orthogonal to each other in the situation denoted by "±0 µm" where the optical axes of the core and the light source coincide with each other. Each of the optical waveguide devices in Inventive Examples 1 to 3 has a small light amount difference between the long and short sides which is 0.8 at the maximum even in the situations denoted by "+100 µm" and "−100 µm" where the center of the light source is displaced in either direction with respect to the optical axis of the core. This shows that the optical waveguide device has a wide allowable range of alignment between the core and the light source.

On the other hand, each of the optical waveguide devices in Comparative Examples 1 and 2 has a large light amount difference between the long and short sides in the range of 0.9 to 2.0 even in the situation denoted by "±0 µm" where the optical axes of the core and the light source coincide with each other. Each of the optical waveguide devices in Comparative Examples 1 and 2 has a greater light amount difference between the long and short sides in the situations denoted by "+100 µm" and "−100 µm" where the center of the light source is displaced with respect to the optical axis of the core. The optical waveguide devices in Comparative Examples 1 and 2 are accordingly poor in the above-mentioned characteristics.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

The optical waveguide device according to the present invention is suitable for use in an optical detection means for detecting a finger, an object and the like in a detection region defined by a rectangular panel, such as an optical touch panel and an optical shape sensor.

What is claimed is:

1. An optical waveguide device, comprising:
a light source provided on an edgewise extending frame part of a rectangular panel; and
an optical waveguide provided on the frame part and including a branched core having a common portion closer to the light source, the branched core being divided from the common portion into two directions orthogonal to each other,
wherein the common portion is disposed at a corner of the frame part,
wherein the branched core further includes a first core portion extending in a straight line along a long side of the panel from the common portion, and a second core portion having a proximal part curved in the form of an arch over a predetermined length from a branch point of the common portion and a distal part extending in a straight line along a short side of the panel, and
wherein the second core portion has a width greater than that of the first core portion.

2. The optical waveguide device according to claim 1, wherein the ratio of the width of the second core portion to the width of the first core portion is in the range of 1.5 to 5.

3. The optical waveguide device according to claim 1, wherein each of the first and second core portions after branching includes light-emitting passages that are subdivisions of each of the first and second core portions, and light beams passing through the light-emitting passages are emitted toward sides opposed respectively to the first and second core portions.

4. The optical waveguide device according to claim 2, wherein each of the first and second core portions after branching includes light-emitting passages that are subdivisions of each of the first and second core portions, and light beams passing through the light-emitting passages are emitted toward sides opposed respectively to the first and second core portions.

5. The optical waveguide device according to claim 1, wherein the light source is disposed at a corner of the frame part on the short side, and light beams directed from the light source toward the long side of the frame part enter an end portion of the common portion.

6. The optical waveguide device according to claim 2, wherein the light source is disposed at a corner of the frame part on the short side, and light beams directed from the light source toward the long side of the frame part enter an end portion of the common portion.

7. The optical waveguide device according to claim 3, wherein the light source is disposed at a corner of the frame part on the short side, and light beams directed from the light source toward the long side of the frame part enter an end portion of the common portion.

8. The optical waveguide device according to claim 4, wherein the light source is disposed at a corner of the frame part on the short side, and light beams directed from the light source toward the long side of the frame part enter an end portion of the common portion.

* * * * *